(12) United States Patent
Turner

(10) Patent No.: US 6,901,140 B2
(45) Date of Patent: May 31, 2005

(54) METHOD FOR REDIRECTING CALLS TO A MESSAGING SYSTEM DURING AN ACTIVE CALL

(75) Inventor: Norris D Turner, Bellwood, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 220 days.

(21) Appl. No.: 10/209,629

(22) Filed: Jul. 31, 2002

(65) Prior Publication Data

US 2004/0022381 A1 Feb. 5, 2004

(51) Int. Cl.⁷ .................................................. H04M 3/42

(52) U.S. Cl. .................................................. 379/211.02

(58) Field of Search ........................ 379/211.01, 211.02, 379/210.01, 210.02, 212.01, 213.01, 201.01, 207.02, 207.11

(56) References Cited

U.S. PATENT DOCUMENTS

| | | | | |
|---|---|---|---|---|
| 5,327,486 A | * | 7/1994 | Wolff et al. | 379/93.23 |
| 5,329,583 A | * | 7/1994 | Jurgensen et al. | 379/266.05 |
| 6,018,671 A | * | 1/2000 | Bremer | 455/567 |
| 6,505,163 B1 | * | 1/2003 | Zhang et al. | 704/275 |
| 6,647,107 B1 | * | 11/2003 | Horrer | 379/214.01 |
| 6,668,049 B1 | * | 12/2003 | Koch et al. | 379/211.02 |
| 6,724,877 B1 | * | 4/2004 | Kucmerowski et al. | 379/215.01 |

* cited by examiner

Primary Examiner—Benny Tieu
(74) Attorney, Agent, or Firm—Steven R. Santema

(57) ABSTRACT

A method for redirecting an active call to a messaging system (126) enables a calling party (108 or 110) placed on hold to leave a message with a called party (108 or 110), thereby obviating the need for the called party to remain on hold. Upon redirecting the call, attributes of the call (e.g., billing rates, assigned resources, etc.) may be revised. Optionally, if the calling party desires to remain on hold, the calling party may cause one or more reminder signals to be sent to the called party such that the called party is reminded that the calling party is on hold.

7 Claims, 3 Drawing Sheets

METHOD FOR REDIRECTING CALLS TO A MESSAGING SYSTEM DURING AN ACTIVE CALL

FIELD OF THE INVENTION

This invention relates generally to the field of communication systems and, more particularly, to a method for that permits a party to redirect a call to a messaging system (e.g., voicemail) during an active call.

BACKGROUND OF THE INVENTION

Communication systems are well known in which a calling party (using, for example, a wireless or wireline phone) may initiate a call to a called party (also using, for example, a wireless or wireline phone). Typically, the call is initiated by the calling party going "off hook" and dialing a directory number associated with the called party phone, causing a network infrastructure to setup communication resources for the call and ring the called party phone. Once the called party answers the phone, an active call session is established and the parties may communicate via the communication resources established for the call. Most typically, the communication is a voice communication, but other forms of communication (e.g., data, video, fax, etc.) are also known.

A problem that arises is that once the called party answers the phone and the active call session is established, the called party may unilaterally place the calling party on hold. When on hold, the calling party has no ability to communicate with the called party and often has no idea when the called party will resume the call. At times, the called party may even forget that the calling party is on hold. Clearly, this is can be very frustrating to the calling party, most particularly when the calling party only needs or desires a brief communication with the called party. Even so, the only option available to the calling party in such case (other than to remain on hold) is to hang up and terminate the call. Adding insult to injury, if the calling party chooses to remain on hold, the network presumes for billing purposes that the parties are actively communicating during the active call and hence will bill for the entire call. As such, the calling party is not only inconvenienced but may be unfairly billed, it seems, for the time placed on hold. A related problem is that assigned network resources are not fully utilized during the hold portion of an active call, yet they remain reserved until such time as the call is terminated; and such resources could more efficiently be used for other calls.

SUMMARY OF THE INVENTION

This problem is solved and a technical advance is achieved in the art by a feature whereby a party engaged in an active call may redirect the call to a messaging system (e.g., voicemail) during the active call. Advantageously, the feature enables a caller placed on hold (or optionally, a called party having placed the caller on hold) to redirect the call to the messaging system, thereby obviating the need for the calling party to remain on hold. Further, upon redirecting the call, attributes of the call (e.g., billing rates, assigned resources, etc.) may be revised.

In one embodiment, a method of the invention comprises establishing an active call between a calling party and a first endpoint. During the active call, a request is received for redirection of the call. The request is received from the calling party or optionally, from a called party defining the first endpoint. Responsive to the request, the call is redirected to a second endpoint (e.g., a messaging system). In such manner, the calling party may leave a message for the called party rather than remain on hold.

In another embodiment, a method of the invention comprises establishing an active call between a calling party and a first endpoint having one or more attributes. The attributes may comprise, for example, assigned resources, billing rate and the like. During the active call, a request is received for redirection of the call. The request is received from the calling party or optionally, from a called party defining the first endpoint. Responsive to the request, the call is redirected to a second endpoint (e.g., a messaging system) and at least one of the attributes is redefined. In such manner, for example, a network may revise billing, network resources or other attributes between a first portion of the call (i.e., when the calling party is connected to the first endpoint) and a second portion of the call (i.e., when the calling party is connected to the second endpoint).

In still another embodiment, a feature is provided whereby a calling party placed on hold while engaged in an active call with a called party may request that one or more reminder signals be sent to the called party. Responsive to the request, the network sends the one or more reminder signals to the called party. In such manner, a called party is reminded that the calling party is on hold and hence, the holding time is likely diminished.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
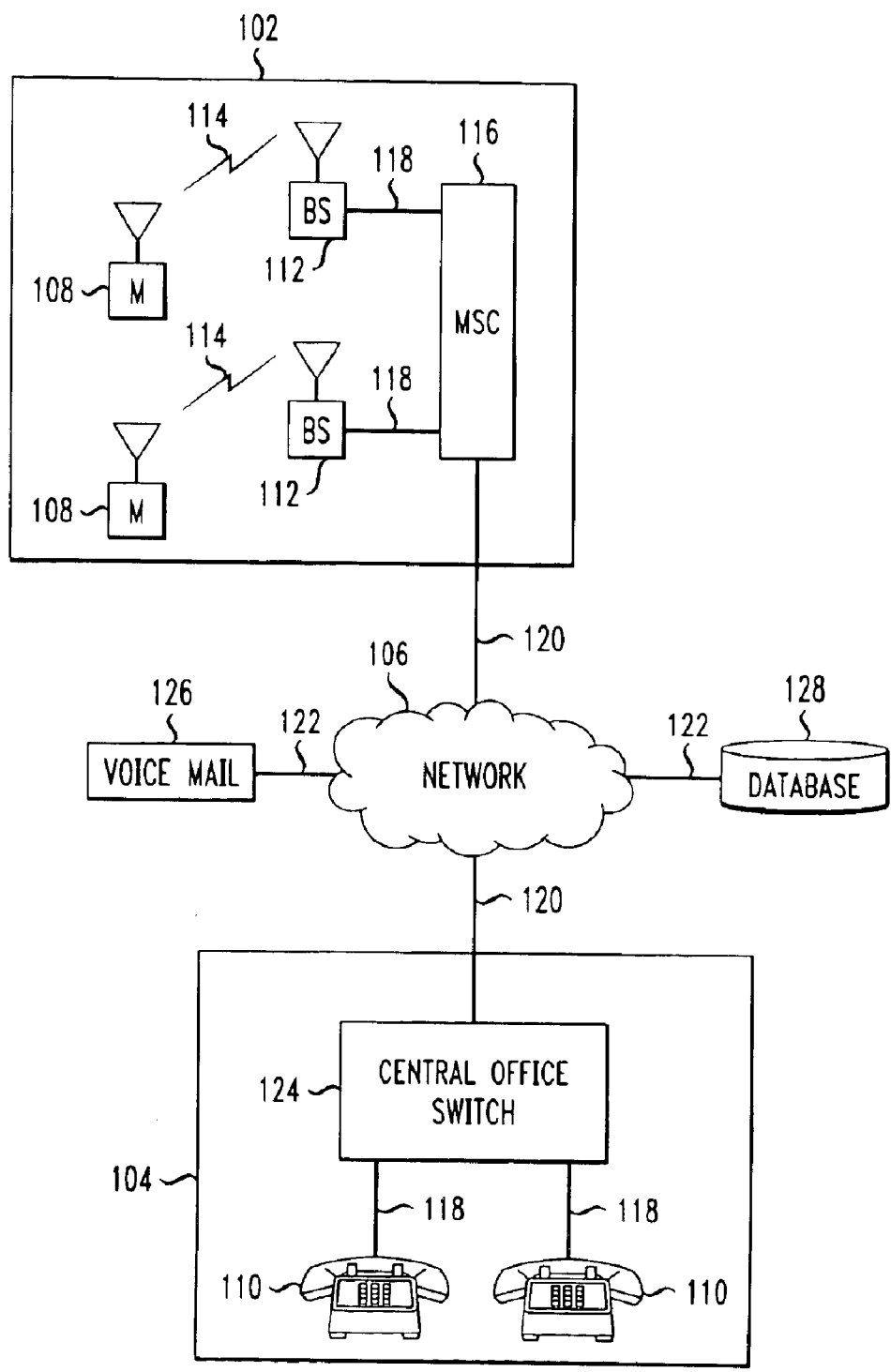
FIG. 1 is a block diagram of a communication system in which several embodiments of the present invention may be implemented.

FIG. 1 shows by way of example and not limitation, a communication system 100 comprising a wireless subsystem 102 and a wireline subsystem 104 interconnected by a network 106. The wireless and wireline subsystems 102, 104 may comprise private systems or public systems or a combination thereof. The network 106 may be implemented using any appropriate transmission, switching and routing technologies, as are known in the art, including but not limited to Internet Protocol (IP) and Asynchronous Transfer Mode (ATM) technologies.

Distributed throughout the wireless subsystem 102 is a plurality of mobile units (e.g., cell phones) 108. Distributed throughout the wireline system 104 is a plurality of wireline units 110 (e.g., telephones, fax machines and the like). Generally, any of the mobile or wireline units 108, 110 may be sources or recipients of calls. Depending on the call, as will be appreciated, the source(s) and recipient(s) may each reside in the wireless network 102 or the wireline network 104, or the source(s) and recipients may be divided among the wireless and wireline networks.

Wireless subsystem 102 comprises in one embodiment a digital cellular communication system. The mobile units 108, generally, are adapted to roam between different RF coverage areas of the wireless subsystem, sometimes referred to as "cells" (not shown) served by base stations 112. The wireless subsystem 102 may include multiple base stations 112 serving multiple cells. Wireless calls to (or from) the mobile units 108 are communicated via RF resources 114 from (or to) the base stations, typically by a predefined wireless protocol such as, for example, Global System for Mobile Communications (GSM), Personal Communications Service (PCS), Code Division Multiple Access (CDMA), Time Division Multiple Access (TDMA) and Advanced Mobile Phone Service (AMPS).

The base stations 112 are connected via links 118 to a call processing control entity, commonly known as a mobile switching center (MSC) 116, which routes the calls, as may be appropriate, to or from the network 106 and the wireline subsystem 104. The links 118 may comprise, without limitation, conventional subscriber lines, ISDN lines, Ethernet LAN, and the like. The MSC 116 may comprise, for example, a 5ESS® switching system, available from Lucent Technologies, Inc. The MSC 116 includes a memory and processor (not shown), for storing and executing software routines for processing and switching calls, for providing various call features to calling parties and for providing access to the network 106 and wireline subsystem 104. The MSC 116 may be configured for operation with generally any suitable circuit, cell, or packet switching technology.

Wireline subsystem 104 comprises in one embodiment the public switched telephone network (PSTN). The wireline units 110 of the PSTN are connected via links 118 to a local call processing control entity commonly referred to as a central office switch 124. The links 118 may comprise, without limitation, conventional subscriber lines, ISDN lines, Ethernet LAN, and the like. The central office switch 124 may comprise, for example, a 5ESS® switching system, available from Lucent Technologies, Inc. The central office switch 124 includes a memory and processor (not shown), for storing and executing software routines for processing and switching calls, for providing various call features to wireline units 110 and for providing access to the network 106 and wireless subsystem 102.

As shown, the communication system 100 of FIG. 1 includes a single MSC 116 and single central office switch 124. However, as will be appreciated, the MSC 116 and central office switch 124 are functional entities that may reside in multiple physical switches or combined into a single switch.

Links 120 carry signaling information and/or payload information between central office switch 124 and network 106, and/or between MSC 116 and network 106. In one embodiment, the payload information comprises voice information. Alternatively or additionally, the payload information may comprise information associated with video, data, text or generally any communication media. The links 120 are logical links that may be physically realized, without limitation, by conventional subscriber lines, ISDN lines, WAN links, wireless links, and the like.

As shown, data links 122 connect the network 106 to a messaging system 126 (such as a voice mail system) and a database 128. In one embodiment, the database 128 stores information associated various subscribers of the wireless or wireline subsystems 102, 104. The data links 122 may comprise LAN or WAN links or virtually any type of link suitable for transporting voice or data to and from the network 106. As will be appreciated, both the messaging system 126 and database 128 are logical entities that may be realized by unitary, centralized devices or multiple, distributed devices. The messaging system 126 and database 128 may be linked directly to the MSC 116 or central office switch 124, rather than (or in addition to) the network 106.

Figure 2:
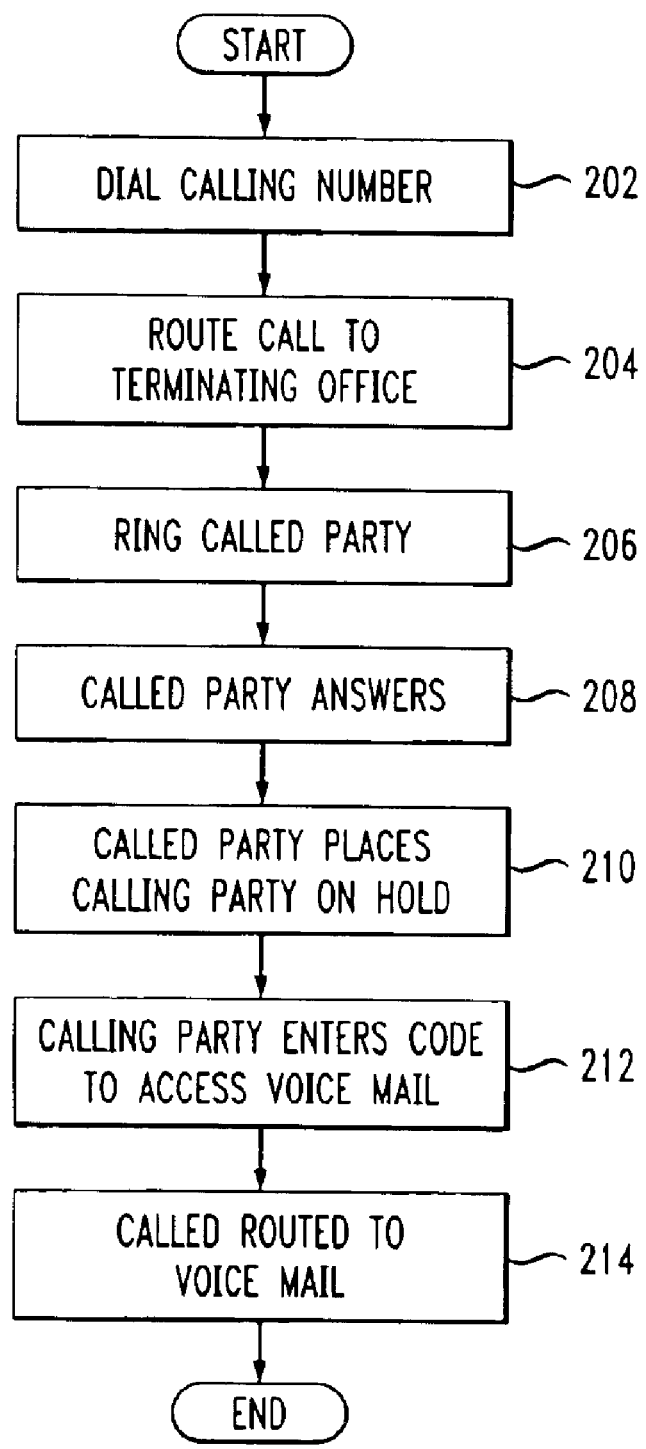
FIG. 2 is a flowchart of a first embodiment of the invention wherein a calling party placed on hold directs the call to a messaging system.

Turning now to FIG. 2, there is shown a flowchart of a method that may be implemented in the communication system of the type shown in FIG. 1, for a calling party placed on hold to direct the call to a messaging system (e.g., messaging system 126). The steps of FIG. 2 are implemented, where applicable, using stored software routines within a calling party phone, MSC 116 and/or central office switch 124.

At step 202, the calling party dials a directory number of a called party phone, as is well known in the art, to initiate a call to the called party phone. The calling party and the called party may comprise any combination of wireless or wireline phones. At step 204, the originating office (i.e., serving the calling party phone) receives the call and routes the call to the terminating office (i.e., serving the called party phone). For example, in the case of a call initiated by a mobile unit 108 and directed to wireline unit 110, MSC 116 receives the call and routes the call to the central office switch 124. Conversely, in the case of a call initiated by a wireline unit 110 and directed to mobile unit 108, central office switch 124 receives the call and routes the call to the MSC 116. Of course, it is also possible that a call will be invoked entirely within the wireless subsystem 102 or wireline subsystem 104, in which case either the MSC 116 or central office switch 124, as the case may be, may both receive the call and serve as the terminating office.

At step 206, the terminating office checks the status of the called party phone and, if the phone is not busy, commences a ring signal to the called party phone. Typically, the ring signal comprises a predefined sequence of rings (usually at least 3–4 rings) over a time period of several seconds, although the ring signal may be shorter or longer for different users based on network and/or user settings. At step 208, the called party answers the phone, thereby establishing an active call between the calling party and a first endpoint, the called party. The active call typically has one or more defined attributes such as, for example, billing rate, assigned resources, and the like. The attributes may be defined by the originating office and/or terminating office. Some time later, at step 210, the called party places the calling party on hold.

Historically, as has been described, a called party placed on hold had effectively no control over the call other than to remain on hold or hang up and terminate the call. According to one embodiment of the present invention, the calling party is able to redirect the call to a second endpoint (e.g., voicemail) after being placed on hold, thereby obviating the need to remain on hold and regaining some control over the call. At step 212, the calling party enters a code on his or her phone, indicating a desire to interrupt the hold period and access the second endpoint (e.g., voicemail). Alternatively, the calling party might request access to the second endpoint by pressing a button, using a point-and-click method or using generally any other appropriate user interface depending on the structure of the calling party phone. At step 210, the calling party request is forwarded to the terminating office, which terminates the call and directs the calling party to the second endpoint (e.g., messaging system 126). In such manner, the calling party is effectively able to pre-empt the hold period and leave a message for the called party.

Alternatively, at step 212, the called party, rather than the calling party, might request redirection of the call to a second endpoint. For example, the called party, having placed the calling party on hold to receive a second call, may determine after taking the second call that the first calling party should be redirected to a messaging system. This might occur, for example, if the second call has a higher priority than the first call or that the second call is expected to have a long duration.

In one embodiment, responsive to receiving the request for redirection of the call (whether from the calling party or called party), the network infrastructure redefines one or more attributes (e.g., billing rates, resources, etc.) associated with the call. As one example, the originating office and/or terminating office may have assigned a first billing rate for the call, based on the location of the calling party and/or called party, and upon re-directing the call to a second endpoint, may assign a second billing rate for the remaining portion of the call. In such manner, a caller redirected to a messaging system may be billed only for the first portion of the call. (Service providers typically do not bill a calling party for leaving voicemail messages but rather, charge the called party upon retrieval of voicemail messages). As another example, the network infrastructure may have initially assigned a first communication resource to support the call and, upon re-directing the call to a second endpoint, may discontinue using the first communication resource and/or assign a second resource for the remaining portion of the call. In such manner, a resource used for the first portion of the call may be re-assigned to other calls.

Figure 3:
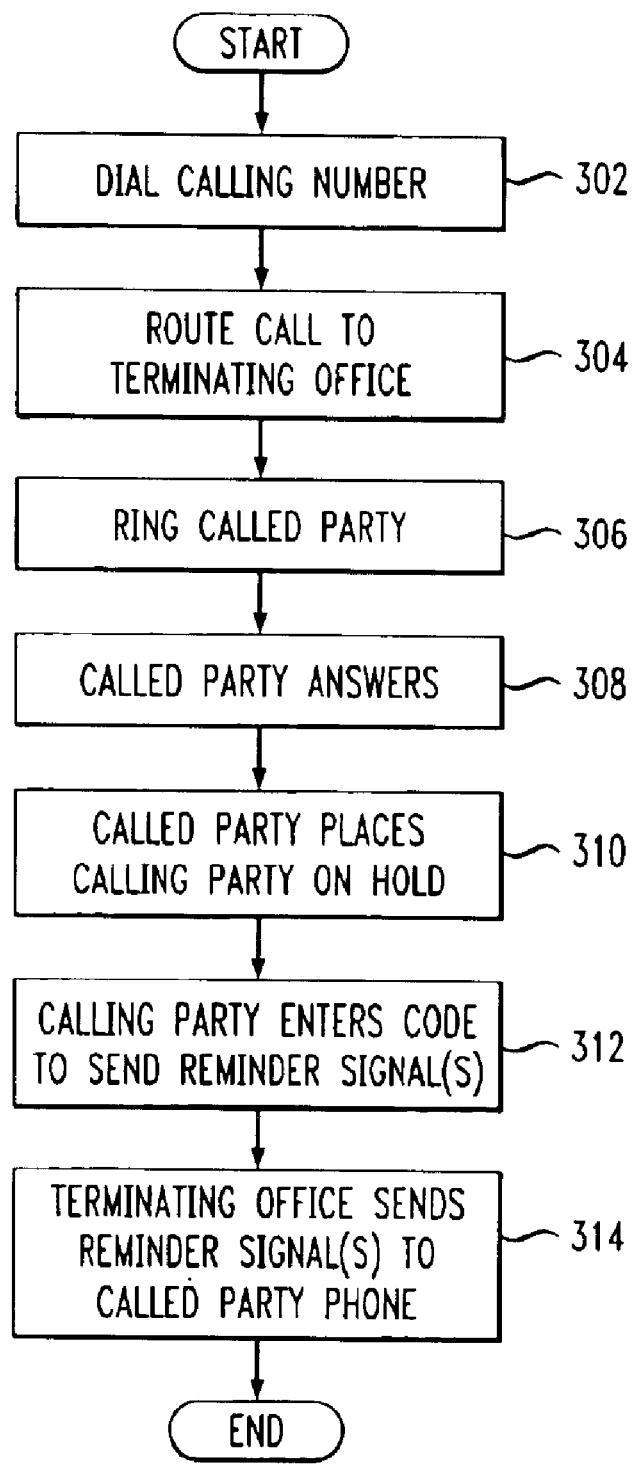
FIG. 3 is a flowchart of a second embodiment of the invention wherein a calling party placed on hold causes reminder signals to be sent to the called party phone.

FIG. 3 is a flowchart of another embodiment of the invention. The steps of FIG. 3 are implemented, where applicable, using stored software routines within a calling party phone, MSC 116 and/or central office switch 124.

At step 302, a calling party dials a directory number of a called party phone. As will be appreciated, the calling party and the called party may comprise any combination of wireless or wireline phones. At step 304, the originating office (i.e., serving the calling party phone) receives the call and routes the call to the terminating office (i.e., serving the called party phone) and at step 306, the terminating office rings the called party phone substantially as has been described in relation to FIG. 2.

At step 308, the called party answers the phone. Some time later, at step 310, the called party places the calling party on hold. The method of FIG. 3 presumes that the calling party chooses to remain on hold for a period of time. At step 312, at any time during the hold period, the calling party enters a code on his or her phone, indicating a desire to send "reminder" signal(s) to the called party. In one embodiment, the reminder signal(s) comprise one or more distinctive tones that are played to the called party phone while the calling party remains on hold, such that the called party is reminded that there is a holding party on the line. The request for reminder signal(s) is forwarded to the terminating office, which applies the reminder signal(s) to the called party phone at step 314.

As will be appreciated, the reminder signal(s) may be implemented in several different ways. For example, the calling party might request reminder signal(s) by pressing a button, using a point-and-click method and so forth, rather than entering a code. In one embodiment, the terminating office interprets the request for reminder signals by retrieving a pre-defined sequence of tones from database 128 and playing the pre-defined sequence in the called party phone. The timing between reminder tones may be selected in advance by the service provider or perhaps may be varied from call to call or even within the same call. As an example, reminder tones may play out at 30-second intervals during a first minute of holding time, decrease to 20-second intervals during a second minute, and so forth. To the extent practical, the calling party might also be provided some level of control over the reminder tones or their timing. Further, reminder tone(s) might also be implemented in combination with the method of FIG. 2. That is, the calling party might request reminder tones during a period of time in which the calling party desires to remain on hold but some time later, upon tiring of being on hold, the calling party may request being forwarded to voicemail.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:

establishing an active vail between a calling party and a called party;

during the active call, receiving a request for redirection of the call; and responsive to the request, redirecting the call to a messaging system, wherein the step of receiving a request comprises receiving a request from the calling party for redirection of the call, and wherein sometime during the active call, the called party places the calling party on hold, the step of receiving a request comprising receiving a request from the calling party when the calling party is on hold.

2. The method of claim 1, wherein the stop of redirecting the call to the messaging system comprises redirecting the call to a voice mailbox of the called party.

3. The method of claim 1, wherein the step of receiving a request comprises receiving a request from the called party for redirection of the call.

4. The method of claim 3, wherein sometime during the active call, the called party places the calling party on hold, the step of receiving a request comprising receiving a request from the called party when the calling party is on hold.

5. The method of claim 3, wherein the step of redirecting the call to the messaging system comprises redirecting the call to a voice mailbox of the called party.

6. A method comprising the steps of:

establishing an active call between a calling party and a called party, the active call having one or more attributes;

during the active call, receiving a request for redirection of the call;

responsive to the request, redirecting the call to a messaging system and re-defining at least one attribute of the one or more attributes, wherein the step of establishing an active call comprises assigning a first billing rate to the call, the step of re-defining at least one attribute comprising assigning a second billing rate for a portion of the call occurring after redirecting the call.

7. A method comprising the steps of:

establishing an active call between a calling party and a called party, the active call having one or more attributes;

during the active call, receiving a request for redirection of the call;

responsive to the request, redirecting the call to a messaging system and re-defining at least one attribute of the one or more attributes, wherein the step of establishing an active call comprises assigning communication resource for the calls, the step of re-defining at least one attribute comprising discontinuing use of the communication resource for a portion of the call occurring after redirecting the call.

* * * * *